United States Patent [19]
Yoshizaki

[11] 3,903,538
[45] Sept. 2, 1975

[54] ELECTRICALLY CONTROLLED CAMERA SHUTTER MECHANISM

[75] Inventor: Akira Yoshizaki, Osaka, Japan

[73] Assignee: Minolta Camera Kabushiki Kaisha, Osaka, Japan

[22] Filed: Apr. 2, 1974

[21] Appl. No.: 457,316

[30] Foreign Application Priority Data
Apr. 4, 1973    Japan.............................. 48-38513

[52] U.S. Cl. ............... 354/234; 354/236; 354/246; 354/251; 354/256; 354/266; 354/50
[51] Int. Cl.² .......................................... G03B 9/08
[58] Field of Search .......... 354/234, 235, 236, 245, 354/246, 250, 251, 256, 261, 266, 50, 51

[56] References Cited
UNITED STATES PATENTS

| | | | |
|---|---|---|---|
| 3,434,403 | 3/1969 | Biedermann.......................... | 354/51 |
| 3,502,010 | 3/1970 | Kennel................................ | 354/51 |
| 3,628,438 | 12/1971 | Loseries............................. | 354/246 |
| 3,646,869 | 3/1972 | Arai.................................... | 354/234 |

Primary Examiner—Monroe H. Hayes
Attorney, Agent, or Firm—Wolder & Gross

[57] ABSTRACT

An electrically controlled camera shutter mechanism includes a leading shutter blade swingable between a cocked closed position and an open position and a pair of overlapping lost motion coupled trailing shutter blades swingable between a cocked open position and a closed position. A lever latching member is swingable successively from a retracted position releasably locking the leading blade in cocked position, which in turn releasably locks the trailing blades in cocked position to an intermediate position releasing the leading blade and locking the trailing blades, and to an advanced position releasing the trailing blades. The depression of a shutter release member transfers the latching member from its retracted to its intermediate position in which a magnetic or permanent magnet armature located on the latching member is advanced into spaced proximatry to an electromagnet which is energized or de-energized by a timing circuit to transfer the latching member from its intermediate to its advanced position to close the shutter. The latching member is retracted with the released raising of the shutter release member.

13 Claims, 4 Drawing Figures

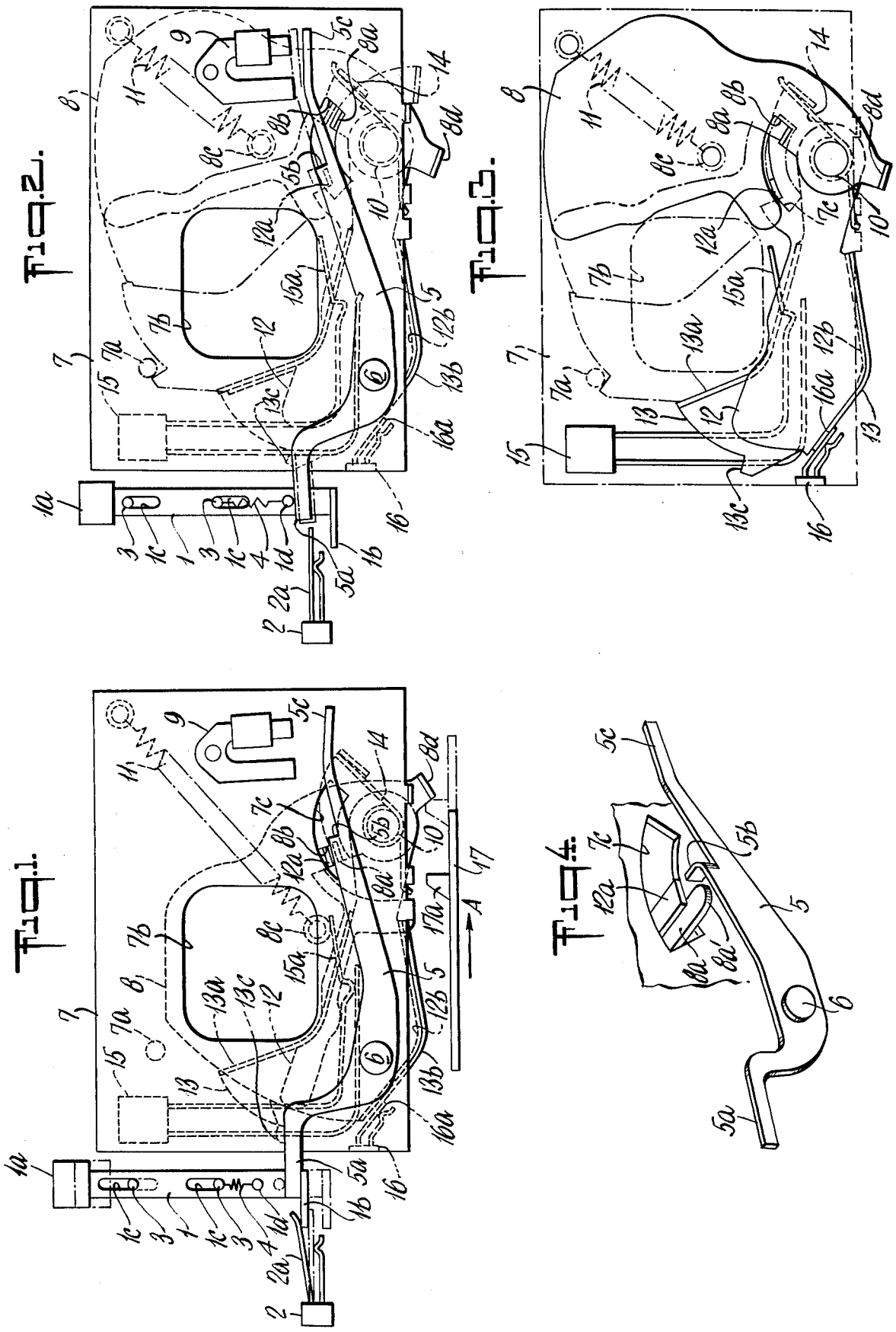

3,903,538

ELECTRICALLY CONTROLLED CAMERA SHUTTER MECHANISM

BACKGROUND OF THE INVENTION

The present invention relates generally to an electrically controlled camera shutter and it relates more particularly to an improved camera shutter whose closing operation is effected by the action of an electromagnet which is controlled by means of an electrical exposure time control circuit.

Conventionally, in electric shutters of the type described above, for opening the shutter, a shutter opening member latched in its cocked position by a first arresting member is released in cooperation with the depression of a shutter release button, while for closing the shutter, a shutter closed member latched in its cocked position by a second arresting member is released under the action of an electromagnet. Accordingly, this results in a complicated mechanism and requires the use of two arresting members.

In addition, the aforesaid second arresting member is urged under the influence of a spring in a direction opposite to that of its movement under the influence of the electromagnet, such that there is required a sufficiently high magnetic force to overcome the spring bias to move the second arresting member by means of the electromagnet, thus resulting in the consumption of a great amount of electric power and the failure to provide economy in such power consumption.

SUMMARY OF THE INVENTION

It is accordingly an object of the present invention to provide an electric camera shutter which minimizes the amount of consumption of electric power.

It is a further object of the invention to provide an electric shutter which is of simple mechanical construction.

It has been found that the foregoing and related objects can readily be attained in an electric shutter of the invention, in which for opening and closing a shutter, a single arresting member is used, which is mechanically moved by means of the depression of a shutter button to open the shutter, after which the arresting member in this condition is further moved by means of an electromagnet to initiate the closing of the shutter. With such an arrangement, the aforesaid arresting member is not under the biassing force of a spring, so that a lesser magnetic force of the electromagnet is required and the consumption of a lesser amount of electric power results. In addition, there are used only a single arresting member and an electric shutter of a simple mechanical construction.

BRIEF DESCRIPTION OF THE DRAWINGS

The exact nature of the present invention, as well as other objects and advantages thereof will be readily apparent from consideration of the following specification taken in conjunction with the accompanying drawings, in which:

FIG. 1 is a plan view of an embodiment of the present invention shown prior to the shutter releasing operation;

FIG. 2 is a plan view illustrating the condition in which the leading shutter blade has completed travelling after the aforesaid releasing operation;

FIG. 3 is a plan view with parts omitted, of the embodiment of FIG. 1; and

FIG. 4 is a perspective view of essential parts of FIG. 1.

DESCRIPTION OF THE PREFERRED EMBODIMENTS

Referring now to the drawings which illustrate a preferred embodiment of the present invention, shown at 1 is a shutter release rod or slide bar which is formed with a shutter button 1a projecting outwardly from a camera body (not shown) and a lower bent portion 1b abutting a movable contact arm 2a of an electric-power-source switch 2 in an exposure time electric control circuit (not shown) and adapted to normally maintain the switch 2 in an open position. An elongated slot 1c formed in rod 1 engages a guide pin 3 affixed to a camera body, the shutter release rod 1 being supported in vertically movable relation by means of the guide pin 3 and urged upwardly under the action of a spring 4 which engages a pin 1d projecting from rod 1.

An arresting lever member 5 formed of a magnetic resilient plate is pivotted to a shutter mounting board 7 by means of a shaft 6, one arm 5a of the arresting member 5 being interposed between the lower bent portion 1b of the shutter release rod 1 and pin 1d. The arresting member 5 is located in position with the arm 5a thereof being maintained in abutting relation with the rod bent portion 1b. As is clear from FIG. 4, a transversely bent ear or engaging portion 5b of lever member 5 engages a bent projection 8a of a leading shutter blade 8, thereby maintaining the leading shutter blade 8 in a cocked position, while a tip portion 5c of lever member 5 serves as an attracting piece is spaced a sufficient distance from an electromagnet 9 and hence in a position to not be effected by the influence of the electromagnet 9 (the position shown by a solid line in FIG. 1). The thickness of the arresting member 5 is so designed that, in the cocking operation which will be described hereinafter, the aforesaid bent engaging portion 5b is resiliently transversely deformed or deflected in an axial direction of the shaft 6 by being urged by the tip of the bent projection 8a of the leading shutter blade 8, while the thickness of the arresting member 5 is such that it has a rigidity sufficiently great to overcome any elastic deformation or deflection in its rotating direction. Alternatively, the arresting member 5 is made of a rigid material which is not susceptible to elastic deformation and is pivotted on the shaft 6 in a slideable relation in its axial direction, while being urged by means such as a spring to thereby cause the aforesaid bent engaging portion 5b to engage the bent projection 8a of the leading shutter blade 8.

The leading shutter blade 8 is pivotted to the shutter board 7 by a shaft 10 and urged in a clockwise direction by a spring 11, with the bottom side 8b of a concave channel shaped section being in engagement with a bent transverse projection 12a of a first trailing blade 12, thereby arresting the trailing shutter blade 12 in a cocked position.

The trailing shutter blade 12, as clearly shown in FIG. 3, includes a first blade 12 and a second blade 13 so as to minimize the space occupied by the shutter mechanism, and provide as large a shutter aperture as possible for a super-miniature camera. In addition, the first blade 12 is urged in a clockwise direction under the influence of a spring 14 to effect the shutter closing operation by means of the spring 14 and is arrested in a cocked position, with the bent projection 12a being in engagement with the concave channel shaped bottom side 8*b* of the leading shutter blade 8, as has been described earlier. On the other hand, the second blade 13 is pivotted on the shaft 10, coupled with the leading shutter blade 8 and the first trailing blade 12, and has a forward bent edge or flange 13*a* and a rear bent edge or flange 13*b*, both of which have been bent toward the first trailing blade 12, at its forward and rear edges with respect to its closing or operating direction, while the first trailing blade 12 has a bent edge or flange 12*b* which has been bent toward the second trailing blade 13 at the rear edge thereof with respect to a shutter closing direction, with the bent edge 12*b* being interposed between the forward and rear bent edges 13*a* and 13*b*, whereby the engagement of the bent edge 12*b* with bent edge 13*a* or 13*b* will cause the second trailing blade 13 to follow the first trailing blade 12, upon shutter closing operation and shutter cocking operation. On the other hand, the second trailing blade 13 is formed with an outer peripheral projection 13c, such that the shutter closing operation causes the projection 13c to abut a stop 7*a* on the shutter mounting board 7 to thereby stop the clockwise rotation of the trailing shutter blades 12 and 13, with the result that the shutter aperture 7*b* may be closed or shut in a light-tight condition or relation by means of the trailing blades 12 and 13. However, the trailing blades 12 and 13 may consist of a single or one piece blade, although the space occupied by such a shutter mechanism becomes substantially larger. However, the present invention is by no means limited to such an arrangement.

The bent projections 8*a* and 12*a* formed on the leading blade 8 and the first trailing blade 12, respectively, project from a sector-shaped opening 7*c* formed in the shutter mounting board 7 and thereby are adapted to engage the bent engaging portion 5*b* of the arresting member 5.

A pin 8*c* provided on the back of the leading blade 8 urges, in its cocked position, a movable contact piece 15*a* of a trigger switch in the aforesaid electric circuit to maintain the normally open switch 15 in a closed position and, upon the commencement of the shutter opening operation, releases the aforesaid contact piece 15a from being urged to its switch closed position whereby to open the switch and cause the aforesaid electric circuit to start determining the exposure time. The second trailing blade 13, in its cocked position, urges a movable contact piece 16*a* of a subsidiary switch 16 arranged in parallel with the electric power switch 2 to thereby maintain the switch 16 in a closed position and, upon shutter closing operation, releases the movable normally open contact piece 16*a* from its closed condition, thereby opening the subsidiary switch 16.

Shown at 17 is a cocking member which moves to the right in cooperation with the camera winding operation to urge a force-receiving portion 8*d* of the leading blade 8 by means of its projection 17*a*, thereby rotating the blade 8 in a counter-clockwise direction to thereby retract the shutter blades, load the springs and cock the shutter.

Considering now the operation of the mechanism described above, FIG. 1 shows the shutter in its cocked condition. When the release rod 1 is depressed by means of the shutter button 1*a* as shown by phantom line in FIG. 1, the electric-power-source switch 2 in the time control electric circuit is closed and the pin 1*d* on the rod 1 abuts the arm 5*a* of the arresting member 5. During this time, the bent engaging portion 5*b* of the arresting member 5 remains engaged with the bent projection 8*a* of the leading blade 8, which is biassed by spring 11, while the urging force (caused by spring 14) of the first trailing blade 12 acts by way of bent projection 12*a* on the leading blade 8 in the same direction as above, such that the arresting member 5 is maintained stationary until the pin 1*d* abuts on the arm 5*a*.

When the shutter button 1*a* is further depressed, then the pin 1d will lower the arm 5*a* of the arresting member 5 to thereby rotate the member 5 in a counterclockwise direction, whereupon the bent engaging portion 5*b* is moved so as to be positioned in the clockwise moving path of the bent projection 12*a* of the first trailing blade 12, prior to the release of the bent projection 8*a* of the leading blade 8 from engagement with the bent engaging portion 5*b*, thereby blocking the clockwise rotation of the first trailing blade 12, i.e., shutter closing operation thereof, while the bent engaging portion 5*b* is disengaged from the bent projection 8*a* of the leading blade 8, releasing the leading blade to rapidly rotate in a clockwise direction under the action of the spring 11 to thereby effect the shutter opening operation. Alternatively, the bent engaging portion 5*b* may be formed so as to project into the clockwise moving path of the bent projection 12*a* of the first trailing blade, before the depression of the shutter release button, when the bent engaging portion 5*b* of course latches the bent projection 8*a* of the leading blade 8. The arresting member 5 completes its rotation in a counterclockwise direction at the lower end of the depression stroke of the shutter release rod 1 and arrests the first trailing blade 12 at its charged position by means of its bent engaging portion 5*b*, while bringing the tip portion 5*c* serving as an electromagnet attracting piece armature close to the electromagnet 9 to thereby effect a small gap therebetween as shown by a solid line in FIG. 2.

When the leading blade 8 commences its shutter opening operation, the trigger switch 15 is opened, whereupon the exposure time interval in the time control electric circuit is started, such that the leading blade 8, the first and second trailing blades 12 and 13 are brought into a condition as shown by a solid line in FIG. 3.

After the lapse of exposure time of a length commensurate to the brightness of a photographic object, the switching circuit of the aforesaid time control electric circuit functions in the known manner to feed an exciting current to the coil of electromagnet 9 to establish an electromagnetic attracting force to the armature defining tip portion 5c of the arresting member, whereby the arresting member 5 is further rotated in a counterclockwise direction from the solid-line-position to the phantom-line-position in FIG. 2.

The aforesaid electromagnet attracting operation causes the bent engaging portion 5*b* of the arresting member 5 to be further upwardly advanced out of the clockwise moving path of bent projection 12*a* of the first trailing blade 12, such that the first trailing blade 12 is released to rotate in a clockwise direction under the action of spring 14, thereby effecting the closing operation of the shutter. During the clockwise rotation of the first trailing blade 12, the bent edge 12*b* engages the forward bent edge 13*a* to thereby rotate the second trailing blade 13 in a clockwise direction, whereby as shown by a phantom line in FIGS. 2 and 3, the shutter aperture 7b is blocked by the two trailing blades 12 and 13 in a light-tight relation and thus completes the shutter closing operation. At the end of the shutter closing operation, the subsidiary switch 16 which has been closed by the second trailing blade 13 is released to break the exciting current to the electromagnet 9. In other words, the subsidiary switch 16 interrupts the exciting current upon termination of the shutter closing operation, such that it aids in preventing useless consumption of the batteries.

After the shutter closing operation has been completed and the depressing force on the shutter button 1a is released, then the release rod 1 is upwardly restored or returned, whereby the lower bent portion 1b of rod 1 raises the movable contact piece 2a of the electric power source switch 2 to thereby open the switch 2, while forcing the arm 5a of the arresting member 5 upwardly to cause the member 5 to rotate in a clockwise direction, thereby returning the same to its initial position as shown by a solid line in FIG. 1.

The winding operation or shutter cocking operation causes the cocking member 17 to move from the solid-line-position to a phantom-line-position as shown by the arrow in FIG. 1. Upon the aforesaid movement, the cocking member 17 urges the force-receiving portion 8d of the leading blade 8 to cause the blade 8 to rotate from the position shown in FIG. 2 to the position shown in FIG. 1 in a counter-clockwise direction, thereby advancing the inclined cam defining portion 8a' to engage portion 5b of the arresting member 5 which is positioned in the moving path of bent projection 8a, such that the bent engaging portion 5b is transversely urged from the aforesaid path, with the arresting member 5 being resiliently deflected. As a result, the bent projection 8a is brought to an over-cocking condition where the bent projection 8a has passed beyond the bent engaging portion 5b and the arresting member 5 is then restored to its initial position due to its resiliency, whereupon the bent engaging portion 5b is brought into the moving path of the bent projection 8a of the leading blade 8 in the direction of the opening of the shutter, whereupon the cocking member 17 is restored to its initial position upon completion of the aforesaid cocking operation. This causes the bent projection 8a to engage the bent engaging portion 5b, and then the leading blade 8 is arrested in a cocked position. The aforesaid retraction movement of the leading blade 8 loads the spring 11, and the movable contact piece 15a of the trigger switch 15 is engaged by pin 8c immediately before the completion of the cocking operation to thereby close the switch 15 upon the completion of the cocking operation.

The first and second trailing blades 12 and 13 rotate in a clockwise direction due to the aforesaid shutter closing operation, thus blocking the shutter aperture 7b in a light tight relation, while the bent projection 12a of the first trailing blade 12 faces the concaved channel bottom side 8b of the leading blade 8 as shown by a phantom line in FIG. 2. As a result, when the leading blade 8 is rotated in a counter-clockwise direction by means of the aforesaid cocking operation, then the bottom side 8b will engage the bent projection 12a of the first trailing blade 12 to thereby load the spring 14, while causing the first trailing blade 12 to rotate in a counter-clockwise direction. In the course of the counterclockwise rotation of the first trailing blade 12, the bent edge 12b engages the rear bent edge 13b formed on the second trailing blade 13 to rotate the blade 13 in a counter-clockwise direction, then reaching its cocked position. This causes the subsidiary switch 16 to be closed. In addition, the arresting of the leading blade 8 in its cocked position causes both the trailing blades 12 and 13 to be arrested in a cocked position by way of the bent projection 12a of the first trailing blade 12 which engages the concave channel bottom side 8b.

Alternatively, the tip portion 5c of the arresting member 5, which serves as a magnetic armature, may be a permanent magnet, while the exposure time control circuit may be arranged in such a manner that, upon closing of electric power source switch 2 by means of depression of release button 1a, the electromagnet 9 is excited so as to provide a polarity to repel the aforesaid permanent magnet and then demagnetized after a lapse of exposure time. With such an arrangement, since the tip portion 5c having a permanent magnet is spaced remotely from the electromagnet 9, as shown in FIG. 1, there will not take place mutual attraction there-between. On the other hand, when the tip portion 5c is lowered to a solid-line-position in FIG. 2 by means of the depression of the release button 1a, the electromagnet will be excited, such that the tip portion 5c may be maintained in this condition due to the repelling force thereof, after which the electromagnet 9 is deenergized by means of the exposure time control circuit. This then causes the tip portion 5c having a permanent magnet to be attracted to the demagnetized electromagnet 9 due to its own attracting force and thereby reaches the phantom-line-position in FIG. 2. This provides the operation the same as that of the aforesaid arrangement. Alternatively, a separate attracting piece or a permanent magnet may be attached to the tip portion 5c, rather than using the tip portion which is itself an attracting piece or permanent magnet.

While there have been described and illustrated preferred embodiments of the present invention, it is apparent that numerous alterations, omissions and additions may be made without departing from the spirit thereof.

I claim:

1. An electric camera shutter comprising:
    shutter opening means urged to move from a cocked position to a released position to open the shutter;
    shutter closing means urged to move from a cocked position to a released position to close the shutter;
    an arresting member moveable between a first position latching said shutter opening and closing means in said cocked position respectively thereof, a second position releasing said shutter opening means and a third position releasing said shutter closing means;
    a shutter release means for moving said arresting member from said first position to said second position by means of mechanical connection therewith in response to the initiation of a shutter release operation to open the shutter; and
    an electromagnet for moving said arresting member from said second to third position to close the shutter; and
    said shutter release means having means for returning said arresting member from said third to first position by means of mechanical connection therewith in response to the termination of the shutter release operation.

2. An electric shutter as in claim 1 wherein said arresting member is moved from said second to third position by the magnetic attraction between said arresting member and said electromagnet energized upon termination of the exposure time of the shutter.

3. An electric shutter as in claim 1 wherein said arresting member is a member swingable from said first to second position and further swingable in the same direction from said second position to said third position.

4. An electric shutter as in claim 3 wherein said shutter release means comprises a movable shutter release member movable between first and second positions and normally biased to said first position, said shutter release member being provided with a first engaging portion which engages said arresting member to rotate said arresting member from said first position to said second position when the shutter release member is moved from said first position to said second position against said bias.

5. An electric shutter as in claim 4 wherein said shutter release member is further provided with a second engaging portion which engages said arresting member to rotate the arresting member from its third position to its first position when the shutter release member is moved from its second position to its first position according to said bias.

6. An electric shutter as in claim 5 further comprising shutter cocking means and wherein said arresting member is formed of resilient material, allowing said shutter opening and closing means forced by said shutter cocking means to move from said released position to said cocked position and thereby latching said shutter opening and closing means in said cocked position.

7. An electrically controlled camera shutter comprising a leading shutter member moveable between a cocked retracted shutter closing position and an advanced shutter opening position and spring biased to its advanced position, a trailing shutter member moveable between a cocked retracted shutter open position and an advanced shutter closing position and spring biased to its advanced position, a latching member moveable between a retracted position releasably locking said leading and trailing shutter members in their cocked positions, an intermediate position releasing said leading shutter member and releasably locking said trailing shutter member in its cocked position and an advanced position releasing said trailing shutter member, manually actuable means having first and second states for mechanically transferring said latching member from its retracted to its intermediate position upon transition of said manually actuatable means from said first to second state thereof and for mechanically returning said latching member from its advanced to its retracted position upon transition of said manually actuatable means from said second to first state and means including an electromagnet for advancing and latching member from its intermediate position to its advanced position in response to a predetermined condition of said electromagnet.

8. The shutter of claim 7 wherein said latching member includes a magnetic armature section disposed proximate to and spaced from said electromagnet when said latching member is in its intermediate position, and is attracted to said electromagnet upon energization thereof to advance said latching member to its advanced position.

9. The shutter of claim 7 wherein said latch member includes a permanent magnet armature and said electromagnet when energized repels said armature and when deenergized permits the advance of said latching member from its intermediate to its advanced position under the influence of the magnetic attraction between said permanent magnet armature and said deenergized electromagnet.

10. The shutter of claim 7 wherein said latching member comprises a lever pivoted for swinging between said retracted, intermediate and advanced positions and includes a locking finger releasably engaging said retracted leading shutter member when said latching member is in its retracted position and releasably engaging said trailing shutter member when said latching member is in its intermediate position and said leading shutter member includes means retaining said trailing shutter member in its retracted position when said leading shutter member is in its retracted position.

11. The shutter of claim 7 wherein said trailing shutter member includes a pair of separably movable first and second sections connected by a lost motion coupling wherein the advance of said first section advances said second section following a predetermined advance of said first section and the retraction of said first section retracts said second section following a predetermined retraction of said first section.

12. The shutter of claim 10 wherein said manually actuatable means comprises a shutter release member moveable between first and second positions and normally biased to said first position, said shutter release member being provided with a first engaging portion which engages said lever to swing said lever from said retracted to intermediate position when shutter release member is moved from said first to second position against said bias, said shutter release member being further provided with a second engaging portion which engages said lever to swing said lever from said advanced to retracted position when said shutter release member is moved from said second to first position according to said bias.

13. An electrically controlled camera shutter comprising a leading shutter member moveable between a cocked retracted shutter closing position and an advanced shutter opening position and spring biased to its advanced position and including a first shoulder moveable along a first path with the movement of said leading shutter member, a trailing shutter member moveable between a cocked retracted shutter open position and an advanced shutter closing position and spring biased to its advanced position and including a second shoulder moveable along a second path proximate said first path with the movement of said trailing shutter member, a latching lever pivoted between its ends and including a magnetic armature proximate one end thereof and a projecting latching finger, said lever being swingable between a retracted position with said latch finger located in the path of said first shoulder, an intermediate position in the path of said second shoulder and out of the path of said first shoulder and an advanced position out of the path of said first and second shoulders, a manually actuatable release member moveable between advanced and retracted positions and spring biased to its retracted position and including a pair of shoulders spaced along the path of movement of said latch member and lying in the path of movement of the other end of said latching lever and on opposite sides of said lever end, and an electromagnet disposed in the path of said armature and closely and remotely spaced therefrom with said lever in its intermediate and retracted positions and advancing said lever to its advanced position upon excitation.

* * * * *